(12) United States Patent
    Marin

(10) Patent No.: US 10,279,856 B2
(45) Date of Patent: May 7, 2019

(54) DETACHABLE CARRYING ASSEMBLY

(71) Applicant: E. Allen Marin, Broomfield, CO (US)

(72) Inventor: E. Allen Marin, Broomfield, CO (US)

(73) Assignee: E. Allen Marin, Broomfield, CO (US)

( * ) Notice: Subject to any disclaimer, the term of this patent is extended or adjusted under 35 U.S.C. 154(b) by 0 days.

(21) Appl. No.: 15/475,660

(22) Filed: Mar. 31, 2017

(65) Prior Publication Data

US 2017/0282988 A1    Oct. 5, 2017

Related U.S. Application Data

(60) Provisional application No. 62/315,998, filed on Mar. 31, 2016.

(51) Int. Cl.
    *B62J 9/00* (2006.01)

(52) U.S. Cl.
    CPC ..................... *B62J 9/003* (2013.01)

(58) Field of Classification Search
    CPC ......................................... B62J 9/003
    USPC ........................................ 224/420
    See application file for complete search history.

(56) References Cited

U.S. PATENT DOCUMENTS

| | | | |
|---|---|---|---|
| 2,256,629 A | 9/1941 | Schwinn | |
| 2,327,537 A | 8/1943 | Lyman | |
| 2,331,211 A | 10/1943 | Lyman | |
| 2,436,991 A | 3/1948 | Dirksen | |
| 2,541,640 A | 2/1951 | Dennis | |
| 2,576,111 A * | 11/1951 | Glenny | B62J 9/003 224/421 |
| 2,583,550 A | 1/1952 | Dennis et al. | |
| 2,700,493 A * | 1/1955 | Meier, Jr. | B62J 9/003 224/421 |
| 2,764,329 A | 9/1956 | Hampton | |
| 2,889,096 A | 6/1959 | Glenny | |
| 3,391,582 A | 7/1968 | Polley, Jr. | |
| 3,603,549 A | 9/1971 | Brilando | |
| 3,945,544 A * | 3/1976 | Walker | B62J 9/02 224/425 |
| 4,066,196 A * | 1/1978 | Jackson | B62J 9/003 224/417 |
| 4,282,993 A | 8/1981 | Humlong | |
| 4,477,004 A | 10/1984 | Barro | |
| 4,730,758 A | 3/1988 | McMurtrey | |
| 4,794,815 A | 1/1989 | Borromeo | |
| 4,798,318 A * | 1/1989 | Irwin | B62J 7/06 224/417 |
| 5,375,748 A | 12/1994 | Katz | |
| 5,435,471 A * | 7/1995 | Chuang | B62J 9/00 224/419 |
| 5,931,361 A | 8/1999 | Schwimmer | |
| 6,029,874 A | 2/2000 | Meggitt | |
| 6,279,803 B1 * | 8/2001 | Smerdon, Jr. | B62J 7/06 224/420 |
| 6,293,449 B1 | 9/2001 | McGuire et al. | |

(Continued)

*Primary Examiner* — Peter N Helvey

(57) ABSTRACT

A detachable carrier assembly is provided. The detachable carrier assembly includes a bracket assembly configured for attachment to a head tube of a bicycle and a plurality of segments configured for insertion into the bracket assembly. The plurality of segments is further configured for detachment from the bracket assembly. A container is attached to the plurality of segments. The container is configured to hold a quantity of desired articles.

14 Claims, 8 Drawing Sheets

(56) References Cited

U.S. PATENT DOCUMENTS

| | | | |
|---|---|---|---|
| 6,634,530 B1 * | 10/2003 | Black | B60R 7/14 206/317 |
| 9,663,171 B2 * | 5/2017 | Rice | B62J 7/00 |
| 2005/0072823 A1 | 4/2005 | Boehmke | |

* cited by examiner

DETACHABLE CARRYING ASSEMBLY

RELATED APPLICATIONS

This application claims priority from U.S. Provisional Patent Application No. 62/315,998, filed Mar. 31, 2016, the disclosure of which is incorporated herein by reference in its entirety.

BACKGROUND

Conventional bicycle carrying structures (i.e. baskets and pouches) are typically disposed directly above the front wheel of the bicycle and can be attached to the bicycle in a variety of manners.

In certain instances, the carrying structures can be attached to the handlebars of a bicycle through multiple strap or clamping systems. Often in these instances, the affixing mechanisms allow the carrying structure to move in an axial direction along the handlebars as the rider navigates the bicycle around turns and corners. The additional weight of the carrying structure and the associated attachment apparatus, and its payload can create weight imbalances that may hinder the operation of the cycle. It is also known in these instances, that the carrying structure can be prone to rotate downward when any payload is positioned in the carrying structure, which can lead to portions of the payload falling out of the carrying structure.

In other instances, the carrying structure can include an attachment to the handlebars and a plurality of struts that extend from the carrying structure to one or more points along the front wheel fork, thereby providing additional support for the carrying structure and its payload. In certain instances, the addition of such struts not only detract from the aesthetics of the bicycle, but also add more weight and potential unbalanced operation when riding. Additionally, such struts cannot be used with bicycles fitted with shock absorbing forks.

In certain instances, the carrying structure is semi-permanently attached to the bicycle and only be removed with hand tools, which provides less flexibility in parking, storing and quickly adjusting or moving the carrying structure.

In certain instances when attached to the bicycle, many carrying structures do not have the flexibility to extend laterally, vertically or forward beyond a single setting and, therefore, cannot be adjusted to accommodate bicycles having different sizes, geometries, or handlebar shapes, or differently sized baskets, pouches or racks.

It would be advantageous if carrying structures could be improved to provide improved attachment, adjustment and operation.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the detachable bicycle carrier assembly.

The above objects as well as other objects not specifically enumerated are achieved by a detachable carrier assembly. The detachable carrier assembly includes a bracket assembly configured for attachment to a head tube of a bicycle and a plurality of segments configured for insertion into the bracket assembly. The plurality of segments is further configured for detachment from the bracket assembly. A container is attached to the plurality of segments. The container is configured to hold a quantity of desired articles.

There is also provided a detachable carrier assembly. The detachable carrier assembly includes a bracket assembly configured for attachment to a head tube of a bicycle and a plurality of segments configured for insertion into the bracket assembly. The plurality of segments is further configured for detachment from the bracket assembly. The plurality of segments connected to a support structure.

There is also provided a detachable carrier assembly. The detachable carrier assembly includes a bracket assembly configured for attachment to a supporting strut. A plurality of segments is configured for insertion into the bracket assembly. The plurality of segments is further configured for detachment from the bracket assembly. The plurality of segments is connected to a support structure.

Various objects and advantages of the detachable bicycle carrier assembly will become apparent to those skilled in the art from the following detailed description, when read in light of the accompanying drawings.

DETAILED DESCRIPTION

The detachable carrier assembly will now be described with occasional reference to the specific embodiments. The detachable carrier assembly may, however, be embodied in different forms and should not be construed as limited to the embodiments set forth herein. Rather, these embodiments are provided so that this disclosure will be thorough and complete, and will fully convey the scope of the detachable carrier assembly to those skilled in the art.

Unless otherwise defined, all technical and scientific terms used herein have the same meaning as commonly understood by one of ordinary skill in the art to which the detachable carrier assembly belongs. The terminology used in the description of the detachable carrier assembly herein is for describing particular embodiments only and is not intended to be limiting of the detachable carrier assembly. As used in the description of the detachable carrier assembly and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present detachable carrier assembly. Notwithstanding that the numerical ranges and parameters setting forth the broad scope of the detachable carrier assembly are approximations, the numerical values set forth in the specific examples are reported as precisely as possible. Any numerical values, however, inherently contain certain errors necessarily resulting from error found in their respective measurements.

In accordance with illustrated embodiments, the description and figures disclose a detachable carrier assembly and a method of using the detachable carrier assembly. The detachable carrier assembly will be described in association with a conventional bicycle. However, as will be discussed in more detail below, the detachable carrier assembly has application to other vehicles and structures. Generally, the detachable carrier assembly includes a bracket assembly, a support structure including a plurality of segments and a container. The bracket assembly is configured for attachment to a bicycle and provides an attachment point for the plurality of segments. The support structure is configured to support the container.

Figure 1:
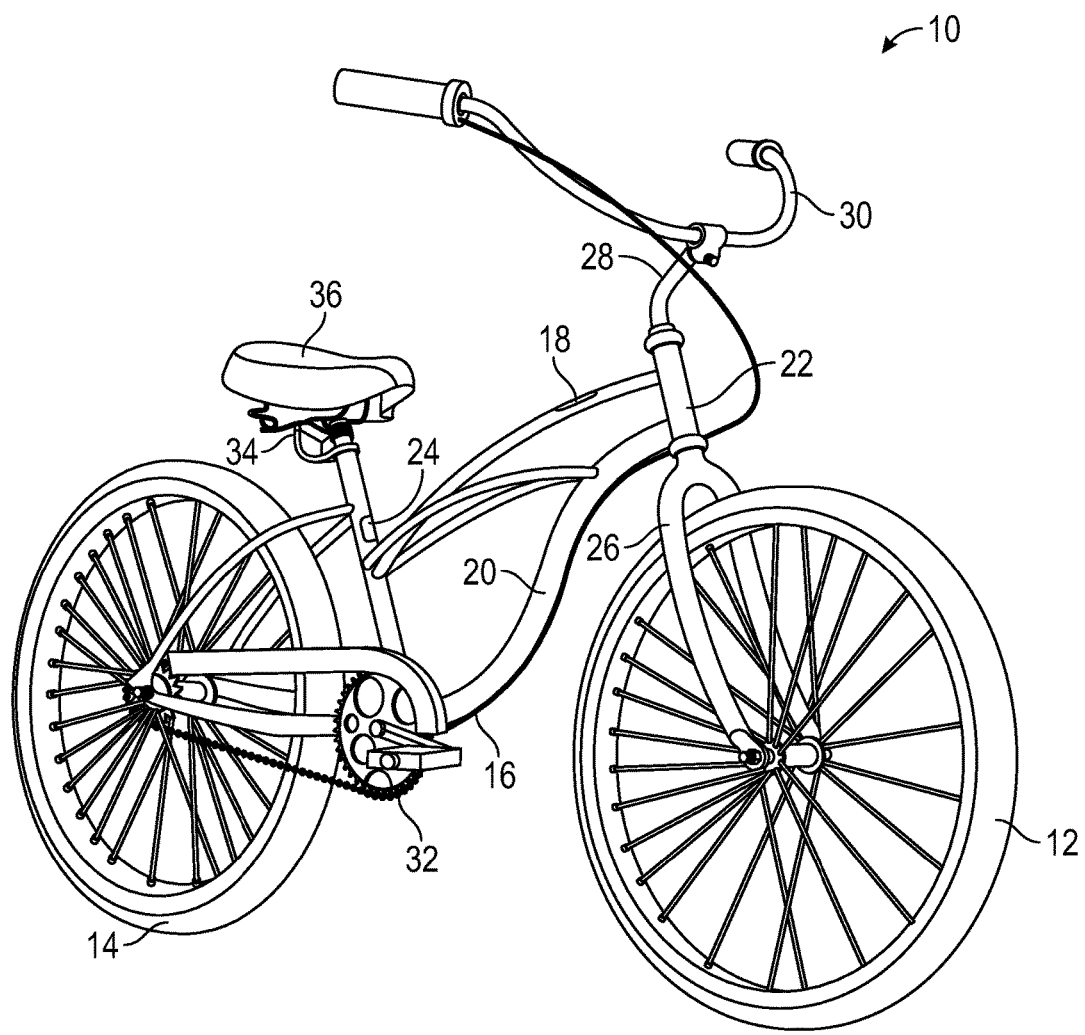
FIG. 1 is a perspective view of a conventional bicycle.

Referring now to FIG. 1, one non-limiting embodiment of a bicycle is shown schematically at 10. The bicycle 10 is conventional in the art and will only be described briefly herein. The bicycle 10 includes a front wheel 12 and a rear wheel 14. The wheels 12, 14 are configured for rotation and further configured to support a frame 16. The frame 16 includes a top tube 18 and a down tube 20. The tubes 18, 20 extend from a head tube 22 to a seat tube 24. The head tube 22 is configured to support a front fork 26 and a handlebar stem 28. A handle bar 30 extends from the handlebar stem 28. A crank assembly 32 is supported by the frame 16 and equipped with devices such as sprockets, belts, chains and the like. The crank assembly 32 is configured to power the bicycle 10. A seat post 34 extends from the seat tube 24 and supports a seat 36.

Figure 2:
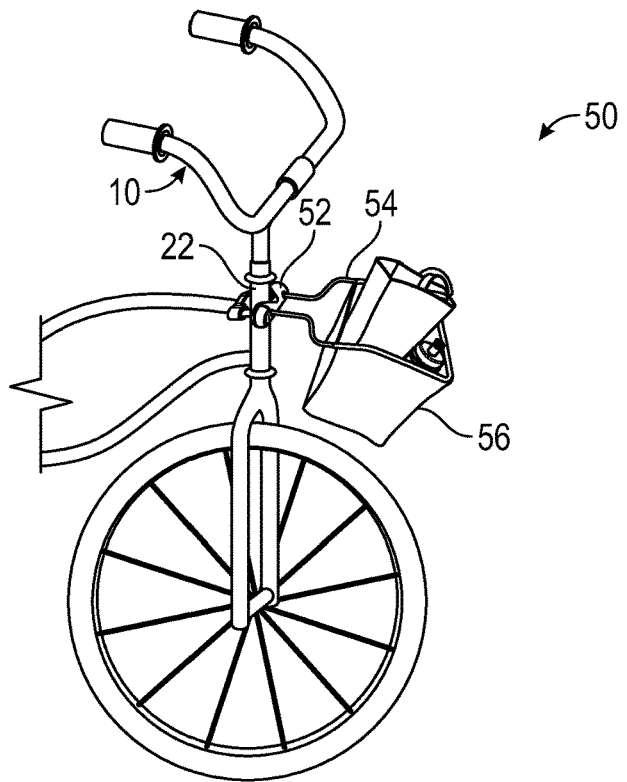
FIG. 2 is a perspective view of a portion of the conventional bicycle of FIG. 1 shown equipped with a detachable carrier assembly.
Figure 3:
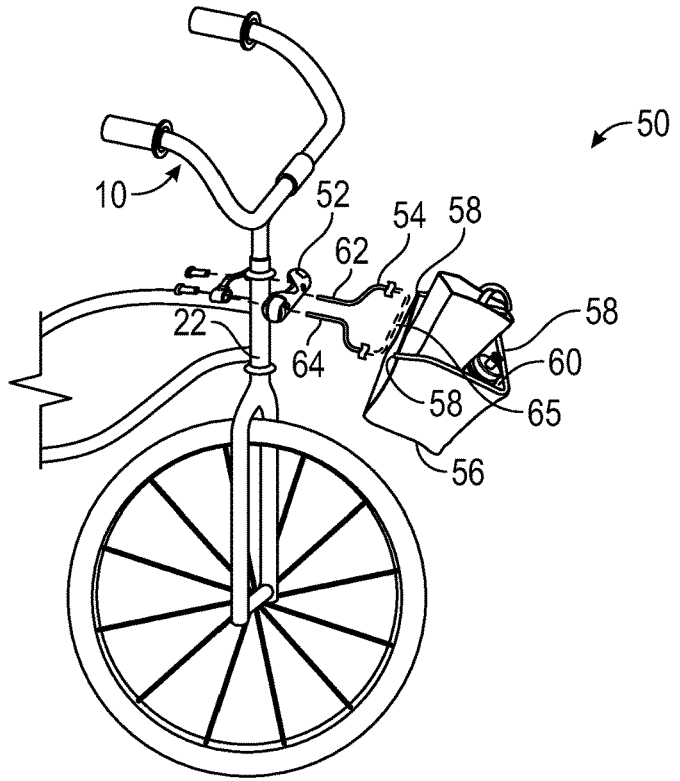
FIG. 3 is an exploded perspective view of a portion of the conventional bicycle of FIG. 1 shown equipped with a detachable carrier assembly.

Referring now to FIGS. 2 and 3, a detachable carrier assembly (hereafter "carrier assembly") is shown generally at 50. The carrier assembly 50 is configured for attachment to a portion of the bicycle 10. In the embodiment illustrated in FIG. 2, the carrier assembly 50 is attached to the head tube 22 of the bicycle 10. However, as will be discussed in more detail below, the carrier assembly 50 can be attached to other portions of the bicycle 10. The carrier assembly 50 includes a bracket assembly 52, a support structure 54 and a container 56.

Referring now to FIG. 3, generally, the bracket assembly 52 is attached to the bicycle 10 and is configured to support the support structure 54. The support structure extends from the bracket assembly 52 and is configured to provide support for the container 56. In the illustrated embodiment, the container 56 is attached to the support structure 54 in a manner such as to hang from the support structure 54. However, in other embodiments, the container 56 can be attached to the support structure 54 in other manners, including the non-limiting example of extending vertically upright from the support structure.

Referring again to the embodiment illustrated in FIG. 3, the container 56 has the form of a bag and is configured to hold a quantity of desired articles. In alternate embodiments, the container 56 can have other forms, including the non-limiting examples of baskets, pouches, sided and flat racks or flat surfaces. The container 56 includes an enclosed passage 58, formed circumferentially at an opening 60 of the container 56. The passage 58 is configured to receive portions of the support structure 54 such that the support structure 54 supports the container 56 in the desired orientation. Further, while the embodiment of the container 56 illustrated in FIG. 3 includes a passage 58 for receiving portions of the support structure 54, it should also be appreciated that in other embodiments, other structures, mechanisms and devices can be used by the support structure 56 to support the container 56. Non-limiting examples of other structures include clips, clamps and hook and loop fasteners.

Referring again to FIG. 3, the support structure 54 is configured to support the container 56 in the desired orientation. The support structure 54 includes opposing first and second segments 62, 64. The first and second segments 62, 64 are configured for insertion into corresponding apertures in the bracket assembly 52. The apertures in the bracket assembly 52 will be discussed in more detail below. The first and second segments 62, 64 extend outwardly from the bracket assembly 52 and cooperate to form an outward segment 65. The outward segment 65 form a desired circumferential shape that corresponds to the circumferential shape of the opening 60 of the container 56. In the illustrated embodiment, the circumferential shape of the outward segment 65 has the general form a rectangle. However, in other embodiments, the circumferential shape of the outward segment 65 of the support structure 54 can have other forms sufficient to support the container 56 in the desired orientation.

Referring again to FIG. 3, the support structure 54 has a circular cross-sectional shape and is formed from a lightweight material, such as for example, aluminum. In alternate embodiments, the support structure 54 can have other cross-sectional shapes and can be formed from other lightweight material, such as for example, reinforced polymeric materials, sufficient to support the container 56 in the desired orientation.

Figure 4:
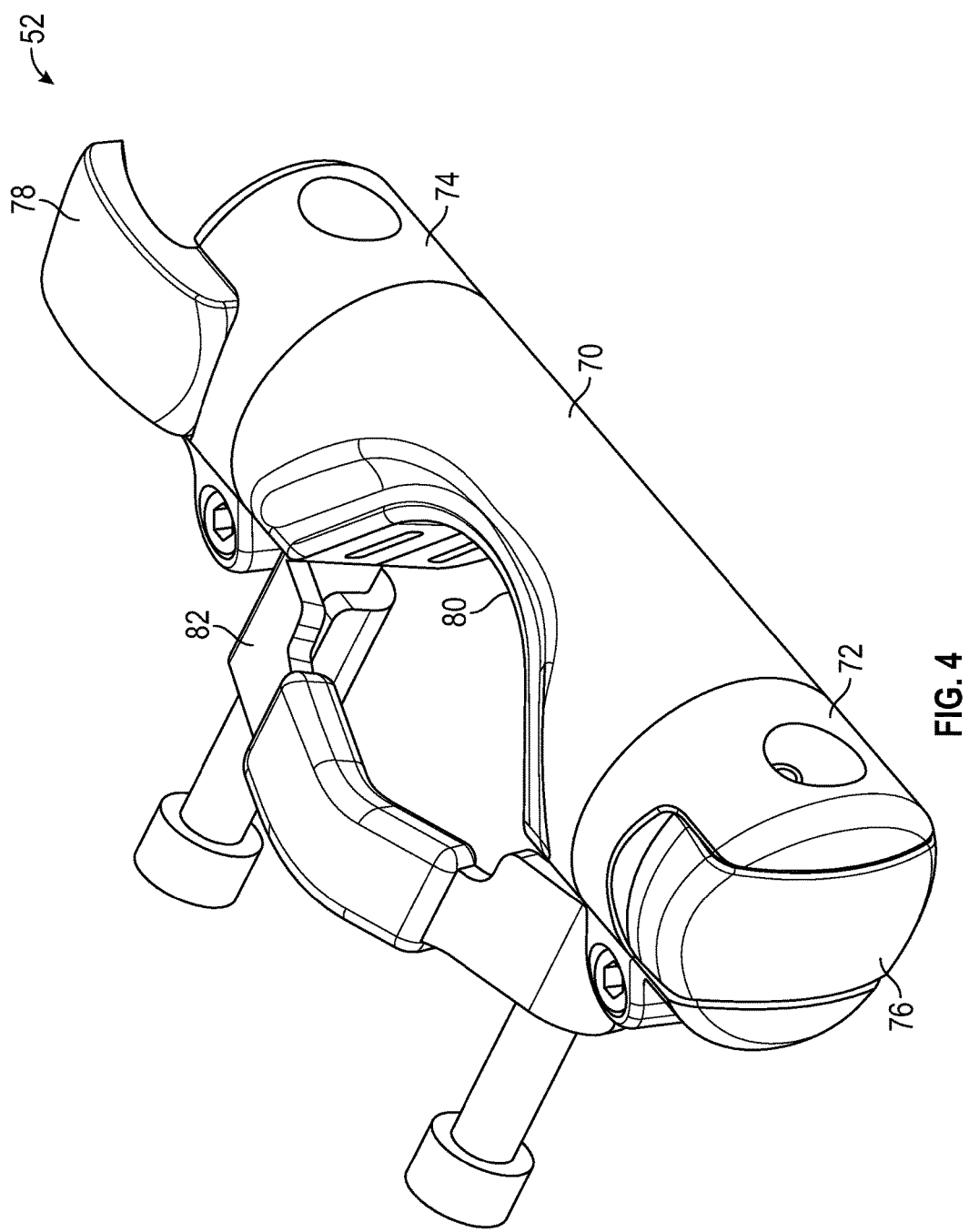
FIG. 4 is a perspective view of a bracket assembly of the detachable carrier assembly of FIG. 3.
Figure 5:
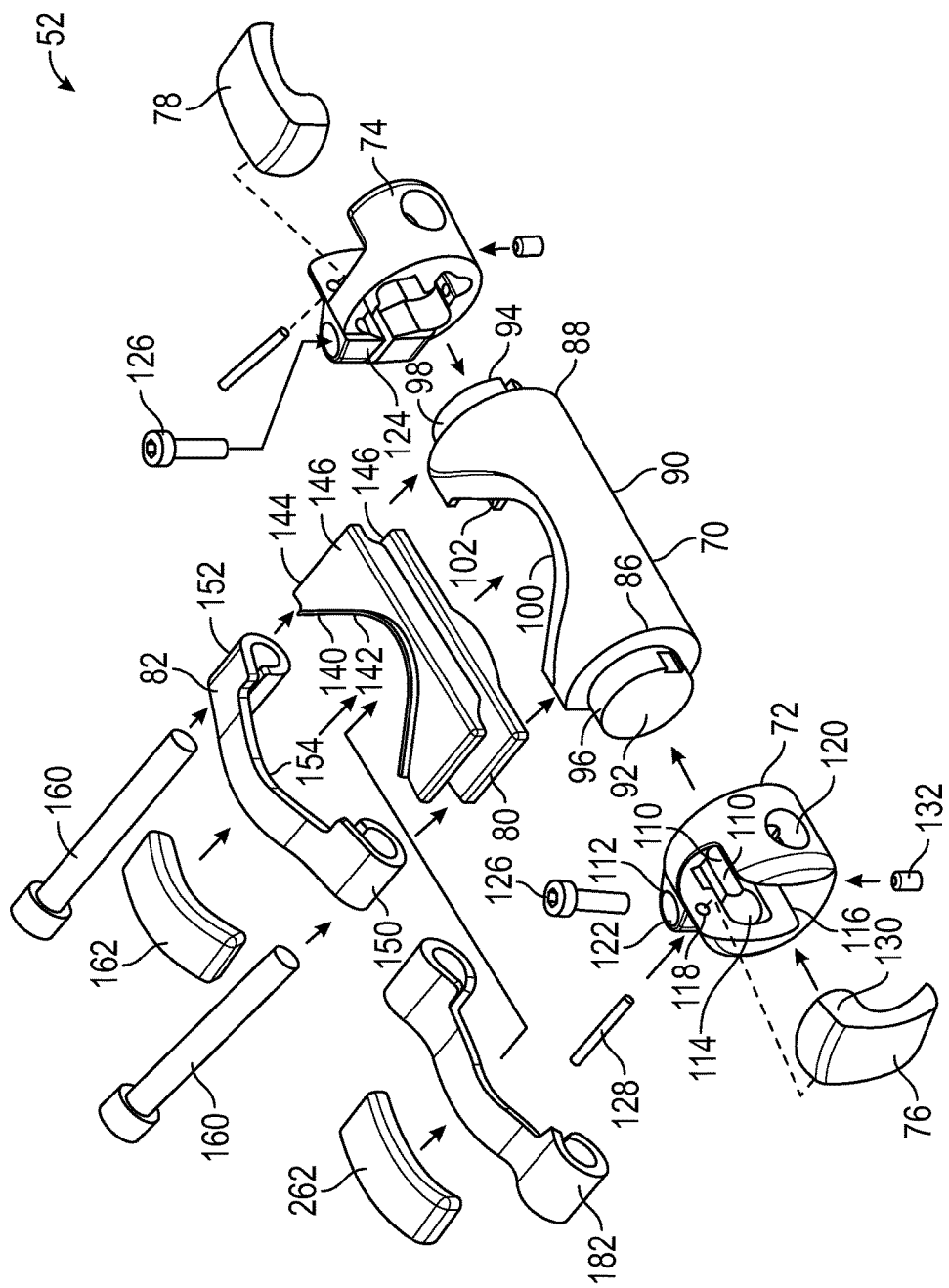
FIG. 5 is an exploded perspective view of the bracket assembly of FIG. 4.

Referring now to FIGS. 4 and 5, the bracket assembly 52 is illustrated. The bracket assembly 52 includes a main body 70, opposing first and second end caps 72, 74, opposing first and quick release mechanisms 76, 78, an insert 80 and a back bracket 82.

Referring now to FIG. 5, the main body 70 includes a first end 86, a second end 88 and the mid portion 90. The first end 86 includes a first projection 92 extending axially in a direction away from the main body 70. Similarly, the second end 88 includes a second projection 94 extending axially in a direction away from the main body 70. The first projection 92 forms a first circumferential surface 96 and the second projection 94 forms a second circumferential surface 98. As will be discussed in more detail below, the first and second circumferential surfaces 96, 98 are configured to receive the first and second end caps 72, 74 such that the first and second end caps 72, 74 can rotate.

Referring again to embodiment illustrated in FIG. 5, the main body 70 and the first and second projections 92, 94 are formed as a single, unitary structure. However, in other embodiments, the main body 70 and the first and second projections 92, 94 can be formed as separate, discrete structures and joined together.

Referring again to FIG. 5, the mid portion 90 of the main body 70 includes a cavity 100. The cavity 100 is configured to receive the insert 80. The cavity 100 includes a concave portion 102 and one or more recess portions extending within inner segments of the mid portion 90 (not shown for purposes of clarity). The concave portion 102 is configured to define a contour for portions of the insert 80. The one or more recess portions are configured to secure the insert 80 to the main body 70. While the illustrated embodiment of the main body 70 includes one or more recess portions, it should be appreciated that in other embodiments, the insert 80 can be secured to the main body 70 by other structures, mechanisms and/or devices, such as the non-limiting examples of fasteners, clips or clamps.

Referring again to FIG. 5, the first end cap 72 is illustrated. The end cap 72 is representative of the second end cap 74. The first end cap 72 includes an inner race 110, opposing tabs 112, 114, a recess 116, a first aperture 118 and a second aperture 120.

Referring again to FIG. 5, the inner race 110 extends within the first end cap 72 and is configured to seat on the first circumferential surface 96 of the first projection 92. Once seated on the first circumferential surface 96 of the first projection 92, the inner race 110 is further configured to allow the first end cap 72 to rotate about the first projection 92. In the illustrated embodiment, the inner race 110 has a circular cross-sectional shape that corresponds to the circular cross-sectional shape of the first circumferential surface 96 of the first projection 92. However, in other embodiments, the inner race 110 and the first circumferential surface 96 of the first projection 92 can have other cross-sectional shapes, sufficient to facilitate rotation of the first end cap 72 about the first projection 92.

Referring again to FIG. 5, the opposing tabs 112, 114 extend from the first end cap 72 and align with each other. The opposing tabs 112, 114 include a third aperture 122 extending therethrough. A gap 124 is formed between the opposing tabs 112, 114. The third aperture 122 is configured as a clearance hole in the tab 112 and a threaded hole in tab 114. The clearance hole in the tab 112 and the threaded hole in the tab 114 are configured to receive a first threaded fastener 126. The first threaded fastener 126 is tightened in a manner such as to secure the inner race 110 against the circumferential surface 96 of the first projection 92. In this manner, the first end cap 72 can be secured to the first projection 92 of the main body 70. While the illustrated embodiment includes the use of the opposing tabs 112, 114 and the first threaded fastener 126, it should be appreciated that in other embodiments, the first end cap 72 can be secured to the first projection 92 of the main body 70 with other structures, mechanisms and devices.

Referring again to FIG. 5, the recess 116 is configured to receive the quick release mechanism 76. The quick release mechanism 76 is secured to the first end cap 72 with a pin 128 extending through the first aperture 118 and into a corresponding aperture 130 located in the quick release mechanism 76. The quick release mechanism 76 and the pin 128 facilitate rotation of the quick release mechanism 76 from a closed position, as shown in FIG. 4, to an open position as shown by the quick release mechanism 78 in FIG. 4. The quick release mechanism 76 will be discussed in more detail below.

Referring again to FIG. 5, the aperture 120 is configured to receive the second segment 64 of the support structure 54 such that in operation, the second segment 64 extends through the first end cap 72 as shown in FIG. 2. With the second segment 64 positioned in this manner, the first threaded fastener 126 can be tightened to fix the first end cap 72 to the first projection 92. In the illustrated embodiment, the aperture 120 has a circular cross-sectional shape that corresponds to the circular cross-sectional shape of the second segment 64 of the support structure 54. However, it should be appreciated that in other embodiments, the aperture 120 can have other cross-sectional shapes sufficient to receive the second segment 64 of the support structure 54.

Referring again to FIG. 5, optionally, a second threaded fastener 132 can extend through the first end cap 72 and seat against the circumferential surface 96 of the first projection 92. The optional second threaded fastener 132 can be configured to further affix the first end cap 72 to the first projection 92 and prevent rotation of the first end cap 72 about the first projection 92. In the illustrated embodiment, the second threaded fastener 132 is a set screw. In alternate embodiments, the second threaded fastener 132 can be other structures, mechanisms and/or devices. However, it should be appreciated that the second threaded fastener 132 is optional and not required for operation of the carrier assembly 50.

Referring again to FIG. 5, the main body 70 and the first and second end caps 72, 74 are formed from lightweight materials, such as for example aluminum. The use of lightweight materials is desirable to minimize the weight added by the carrier assembly 50. In other embodiments, the main body 70 and the first and second end caps 72, 74 can be formed from other lightweight materials, such as for example reinforced polymeric materials.

Referring again to FIG. 5, the insert 80 is configured for assembly to the main body 70. The insert 80 includes a concave portion 140 having an outer surface 142. The concave portion 140 is supported by an attachment segment 144. The attachment segment 144 is configured for seating within the one or more recess portions of the main body 70. The attachment segment 144 includes one or more attachment projections 146 configured for seating in corresponding recess portions of the main body 70. In alternate embodiments, the attachment segment 144 can include other structures configured to seating in corresponding recess portions of the main body 70.

Referring again to FIG. 5, the concave portion 140 of the insert 80 is configured for seating against the head tube 22 of the bicycle 10 as shown in FIG. 1. In the embodiment illustrated in FIG. 5, the concave portion 140 has an arcuate cross-sectional shape that corresponds to the circular cross-sectional shape of the head tube 22. However, it should be appreciated that in other embodiments, the concave portion 140 of the insert 80 can have other cross-sectional shapes that correspond to the cross-sectional shape of the head tube 22.

Referring again to FIG. 5, the insert 80 is formed from lightweight, flexible materials having non-marring properties, such as for example, vulcanized rubber or certain polymeric materials. The use of lightweight, flexible, non-marring materials is desirable to minimize the weight added by the insert 50 and further desirable to minimize the impact of the carrier assembly on the frame 16.

Figure 6:
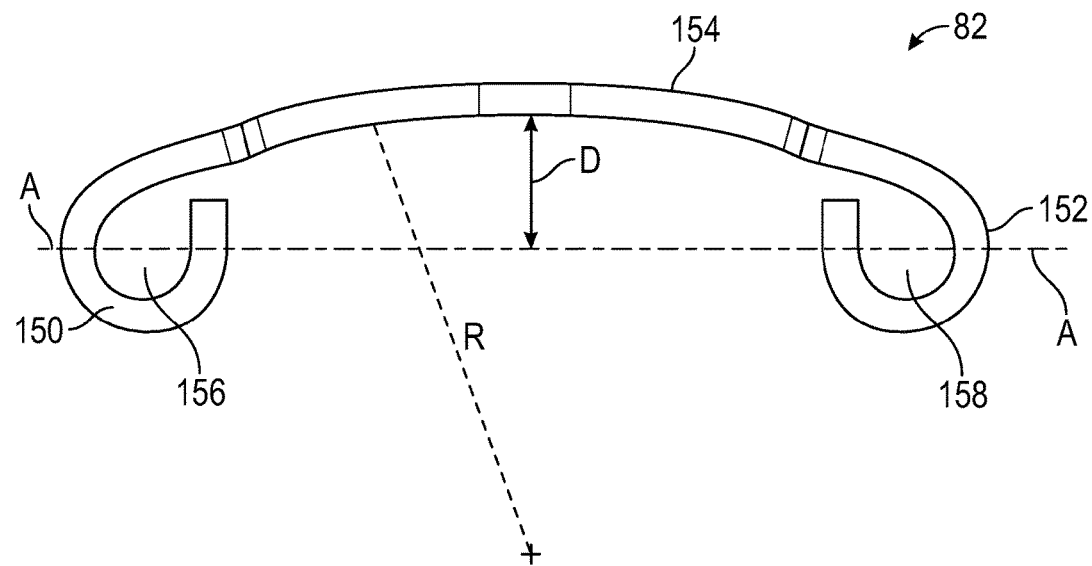
FIG. 6 is a plan view of a first embodiment of a back bracket of the bracket assembly of FIG. 4.

Referring now to FIGS. 5 and 6, the back bracket 82 is configured to secure the main body 70 to the bicycle frame 16. The back bracket 82 includes opposing first and second legs 150, 152 connected together by a center segment 154. The first leg 150 includes a first aperture 156 and the second leg 152 includes a second aperture 158. The apertures 156, 158 are each configured to receive fasteners 160 in a clearance manner. The fasteners 160 are configured to extend through the first and second apertures 156, 158 and into corresponding threaded apertures in the main body 70.

Referring again to FIGS. 5 and 6, the center segment 152 has an arcuate cross-sectional shape. The arcuate cross-sectional shape is configured to seat against the top tube 18 of the frame 16. Referring now to FIG. 6, the center segment 152 has a radius R in a range of from about 6.0-10.0 inches and a clearance dimension D of about 1.0-3.0 inches from a horizontal line A-A extending through the center of the apertures 156, 168. The radius R and clearance dimension D of the center segment 152 are configured to allow a close fit with the top tube 18 of the frame 16. However, in other embodiments, the radius R and clearance dimension D of the center segment 152 can have other dimensions configured to allow a close fit with the top tube 18 of the frame 16.

Referring again to FIG. 5, the back bracket 82 can include a sleeve 162. The sleeve 162 is configured to encase the center segment 152 of the back bracket 82 and seat against the top tube 18 of the frame 16 when the carrier assembly 50 is in an installed position. The sleeve 162 is formed from lightweight, flexible materials having non-marring properties, such as for example, vulcanized rubber or certain polymeric materials. The use of lightweight, flexible, non-marring materials is desirable to minimize the weight added by the sleeve 162 and further desirable to minimize the impact of the carrier assembly 50 on the frame 16.

Figure 7:
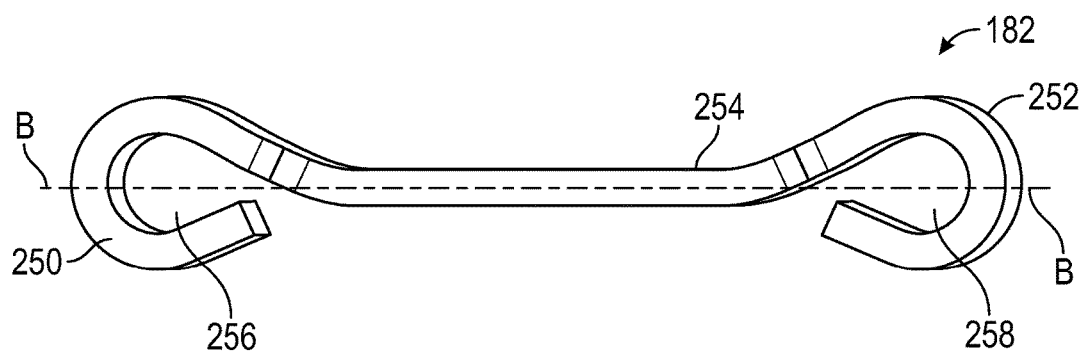
FIG. 7 is a plan view of a second embodiment of a back bracket of the bracket assembly of FIG. 4.

It is within the contemplation of the carrier assembly 50 that the frame 16 of the bicycle 10 is different from that illustrated in FIG. 1, such that the back bracket 82 cannot be positioned to seat against the top tube 18 of the frame 16. In such instances, it may be desirable to use an alternate back bracket positioned in an alternate location. Referring now to FIGS. 5 and 7, an alternate back bracket 182 is illustrated.

Referring now to FIGS. 5 and 7, the alternate back bracket 182 is configured to secure the main body 70 to the bicycle frame 16. The back bracket 182 includes opposing first and second legs 250, 252 connected together by a center segment 254. The first leg 250 includes a first aperture 256 and the second leg 252 includes a second aperture 258. The apertures 256, 258 are each configured to receive fasteners 160 in a clearance manner. The fasteners 160 are configured to extend through the first and second apertures 256, 258 and into corresponding threaded apertures in the main body 70.

Referring again to FIGS. 5 and 7, the center segment 254 has a substantially flat cross-sectional shape. The term "substantially flat cross-sectional shape", as used herein, is defined to mean a horizontal line B-B extending through the center of the apertures 256, 268 substantially coincides with a horizontal line extending through the center segment 254. The substantially flat cross-sectional shape is configured to sit under the top tube 18 of the frame 16.

Referring again to FIG. 5, the back bracket 182 can include a sleeve 262. In the illustrated embodiment, the sleeve 262 is the same as, or similar to, the sleeve 160 described above and shown in FIG. 5. However, in other embodiments, the sleeve 262 can be different from the sleeve 160.

Figure 8:
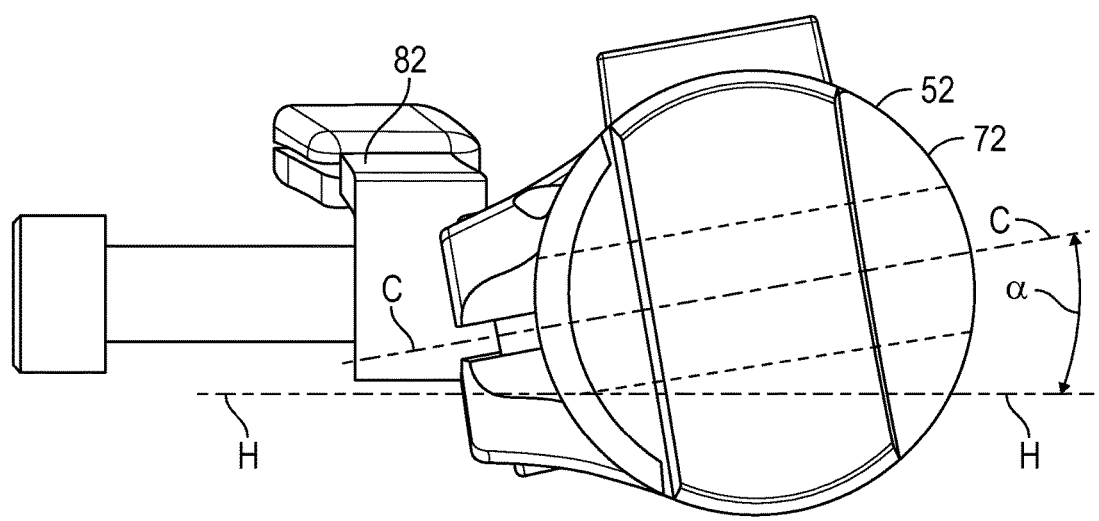
FIG. 8 is a side view of the bracket assembly of FIG. 4 illustrating a range of rotation of a side cap.

As discussed above, the second aperture 120 of the first and second end caps 72, 74 are configured to receive the first and second segments 62, 64 of the support structure 54. The first and second end caps 72, 74 are further configured for rotation about the first and second projections 92, 94 of the bracket assembly 70. With the support structure 54 installed in the bracket assembly 70, the support structure 54 rotates as the first and second end caps 72, 74 rotate. Rotation of the support structure 54 facilitates location of the container 60 at different positions. Referring now to FIG. 8, the bracket assembly 52 is illustrated. The bracket assembly 52 includes the first end cap 72 and the back bracket 82. The first end cap 72 includes the aperture 120 configured to receive the first and second segments 62, 64 of the support structure 54. A center line C-C of the aperture 120 forms an angle α with a substantially horizontal line H-H. In the illustrated embodiment, the angle α can be in a range of from about −30.0° to about +70.0°. In alternate embodiments, the angle α can be less than about −30.0° or more than about +70.0°, sufficient to facilitate location of the container 60 at different positions.

Figure 9:
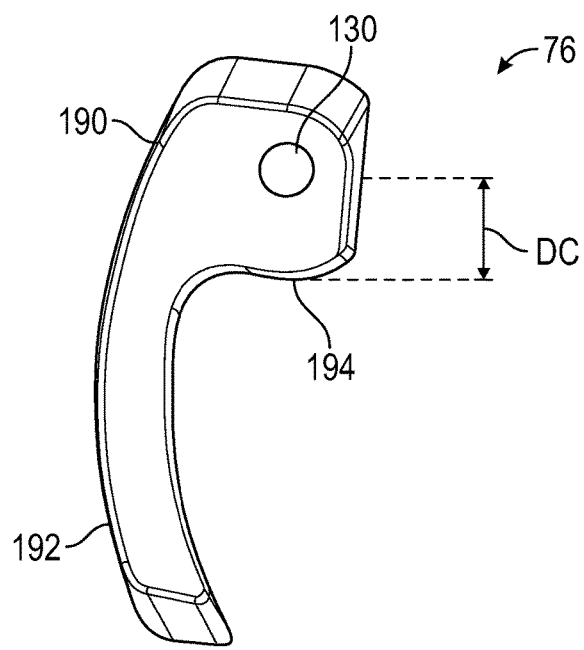
FIG. 9 is a side view, in elevation, of a quick release mechanism of the bracket assembly of FIG. 4.
Figure 10:
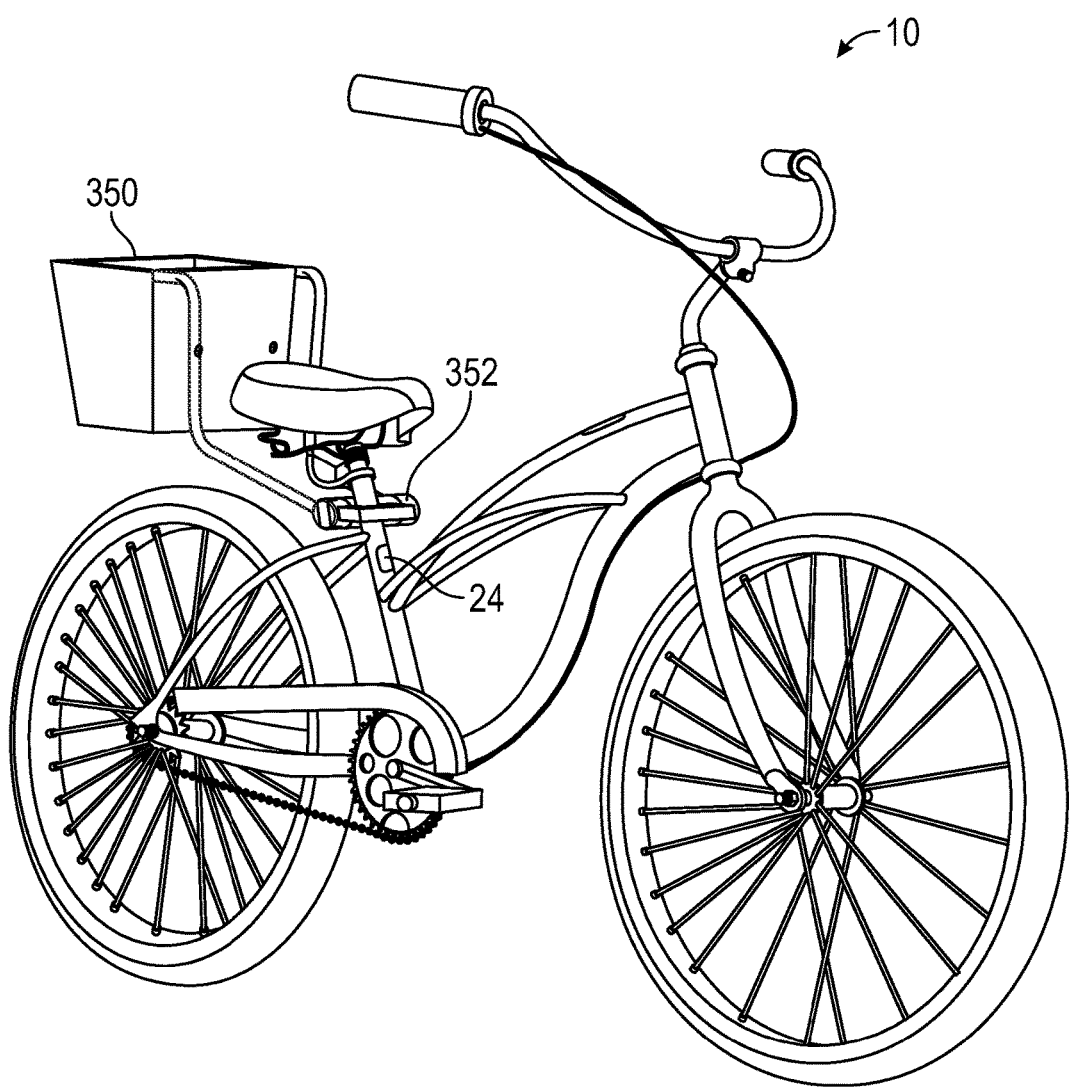
FIG. 10 is a schematic view of the conventional bicycle of FIG. 1 illustrating an alternate form of attachment.

Referring now to FIG. 9, the quick release mechanism 76 is illustrated. The quick release mechanism 76 is configured to engage a portion of the first and second segments 62, 64 of the support structure 54 after the support structure 54 has been inserted into the apertures 120 of the first and second end caps 72, 74. The quick release mechanism 76 includes a main body 190 and a leg 192 extending from the main body 190. The main body 190 includes the aperture 130 configured to receive the pin 128 and a cam portion 194. The cam portion 194 is configured to engage that portion of the support structure 54 positioned within the first end cap 72. The cam portion 194 extends from the aperture 130 a distance DC, such that a friction fit is created between the cam portion 194 and the support structure 54 as the quick release mechanism 76 is rotated to a closed position as shown in FIG. 4. The friction fit between the quick release mechanism 76 and the support structure is configured to securely hold the support structure 54 is place. In the illustrated embodiment, the distance DC is in a range of from about 0.125 inches to about 0.50 inches. However, in other embodiments, the distance DC can be less than about 0.125 inches or more than about 0.50 inches, sufficient to create a friction fit between the cam portion 194 and the support structure 54 as the quick release mechanism 76 is rotated to a closed position. The quick release mechanism 76 advantageously allows the engagement and disengagement of the support structure 54 by hand and without the use of hand tools. Accordingly, the position of the support structure 54 and the container 56 can be readily adjusted and the support structure 54 and the container 56 can be readily removed from the bracket assembly 52 by hand and without the use of hand tools. While the embodiment of the quick release mechanism 76 shown in FIG. 5 includes a main 190, a leg 192 and a cam portion 194, it should be appreciated that in other embodiments, the quick release mechanism 76 can be other structures, mechanisms and devices configured to engage a portion of the first and second segments 62, 64 of the support structure 54 after the support structure 54 has been inserted into the apertures 120 of the first and second end caps 72, 74. Non-limiting examples of other quick release structures, mechanisms and devices include clips, clamps, nuts, pins, screws and the like. It is also within the contemplation of the invention that more permanent structures and devices can be used to engage a portion of the first and second segments 62, 64 of the support structure 54 after the support structure 54 has been inserted into the apertures 120 of the first and second end caps 72, 74.

The carrier assembly 50 has been described above and shown in FIGS. 2 and 3 as being attached to the head tube 22 of the bicycle 10. However, it is within the contemplation of the invention that the carrier assembly 50 can be attached to other portions of a bicycle. Referring now to FIG. 9, a carrier assembly 350 is attached to a seat tube 24 of a bicycle 10. Used in this manner, a bracket assembly 352 engages the seat tube 324 in the same manner as the bracket assembly 52 engages the head tube 22, as shown in FIGS. 2 and 3. In the embodiment illustrated in FIG. 9, the bracket assembly 352 can be the same as, or similar to the bracket assembly 52 described above and shown in FIGS. 2 and 3. In alternate embodiments, the bracket assembly 352 can be different from the bracket assembly 352.

The carrier assembly 50 provides significant benefits, although all benefits may not be present in all embodiments. First, the attachment of the carrier assembly 50 to the head tube of the bicycle prevents movement of the carrier assembly 50 in an axial direction along the handlebars as the rider navigates the bicycle around turns and corners. Second, the attachment of the carrier assembly 50 to the head tube of the bicycle prevents the weight of the carrying structure, the associated attachment apparatus and its payload from creating a weight imbalance that may hinder the operation of the cycle. Third, the attachment of the carrier assembly 50 to the head tube of the bicycle prevents a downward rotation of the carrying structure when a payload is positioned in the carrying structure, thereby preventing portions of the payload from falling out of the carrying structure. Fourth, the carrying structure eliminates the need for additional supporting devices, such as for example struts connected to the front wheel fork. Fifth, the carrying structure can be removed from the bicycle by hand and without the need of hand tools. Finally, the carrying structures advantageously has the flexibility to extend laterally, vertically or forward beyond a single setting and, therefore, can be adjusted to accommodate bicycles having different sizes, geometries, or handlebar shapes, or differently sized baskets, pouches or racks.

Figure 11:
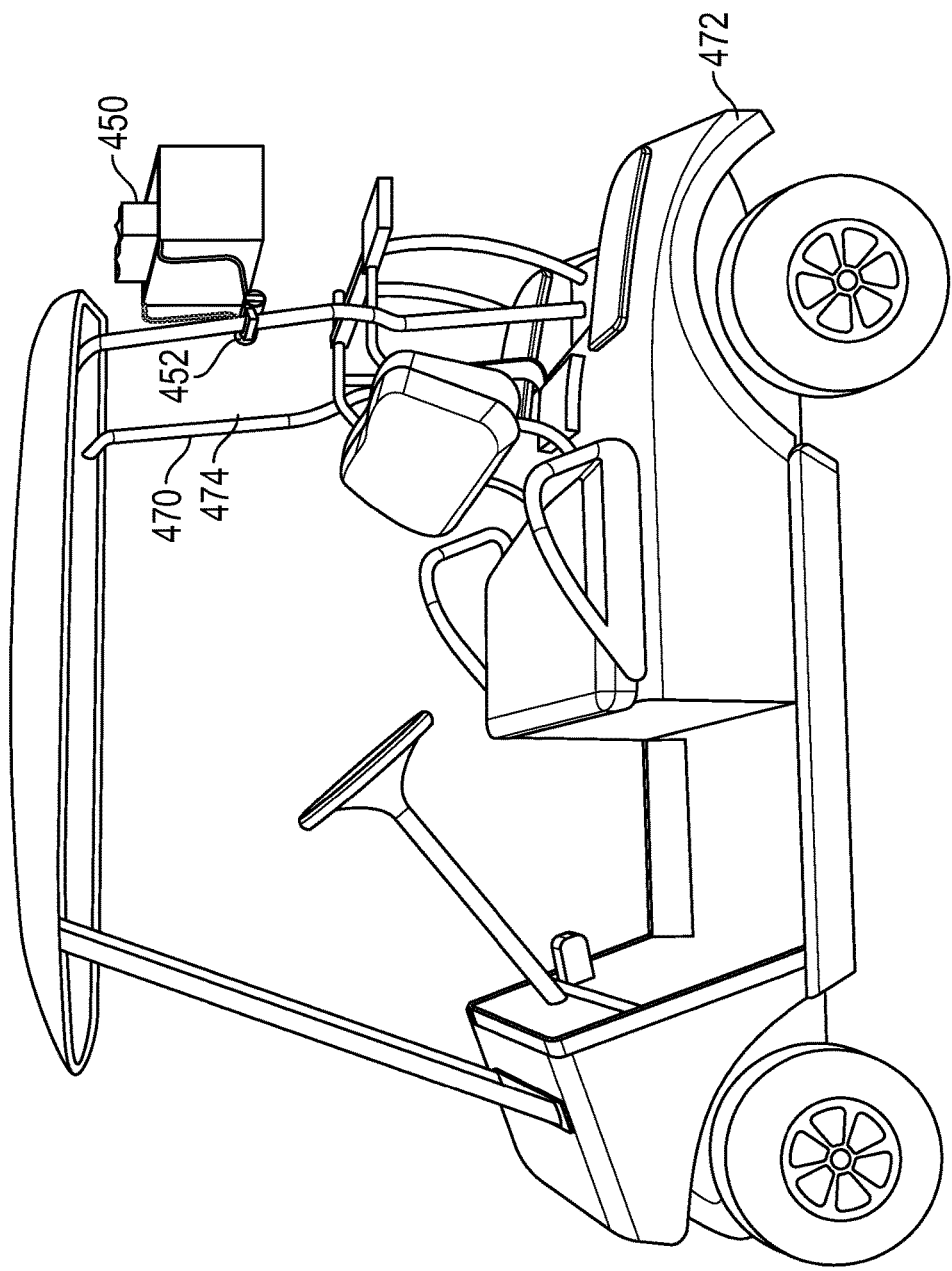
FIG. 11 is a schematic view of a golf cart equipped with a detachable carrier assembly.

In the embodiment illustrated in FIGS. 1-10, the carrier assembly 50 has been described above in association with a bicycle 10. However, it is within the contemplation of the invention that the carrier assembly 50 can be attached to other vehicles and structures. Referring now to FIG. 11, a carrier assembly 450 is shown attached to a roof structure 470 for a golf cart 472. Used in this manner, a bracket assembly 452 engages a roof support strut 474 in the same manner as the bracket assembly 52 engages the head tube 22 as shown in FIGS. 2 and 3. In the embodiment illustrated in FIG. 11, the bracket assembly 452 can be the same as, or similar to the bracket assembly 52 described above and shown in FIGS. 2 and 3. In alternate embodiments, the bracket assembly 452 can be different from the bracket assembly 352. It should be clear from FIG. 11, that the bracket assembly of the carrier assembly 450 can be attached to any vehicle or structure having a supporting leg, strut or member. Accordingly, it is within the contemplation of the invention that the carrier assembly can be attached to other vehicles, including the non-limiting examples of scooters, motorcycles, tractors, ATV's, trucks and the like, as well as other structures, including the non-limiting examples of pallet racks, shelving, book cases and the like.

The principle and mode of operation of the detachable bicycle carrier assembly has been described in certain embodiments. However, it should be noted that the detachable bicycle carrier assembly may be practiced otherwise than as specifically illustrated and described without departing from its scope.

What is claimed is:

1. A detachable carrier assembly comprising:
    a bracket assembly configured for attachment to a head tube of a bicycle, the bracket assembly including a main body and opposing first and second projections extending in axial directions from the main body, a first end cap having an inner race configured to rotatably seat on the first projection and a second end cap having an inner race configured to rotatably seat on the second projection, the first and second end caps each having a rotatable cam release mechanism;
    a plurality of segments configured for insertion into the first and second end caps of the bracket assembly, the plurality of segments further configured for detachment from the bracket assembly; and
    a container attached to the plurality of segments, the container configured to hold a quantity of desired articles;
    wherein with the plurality of segments inserted into the first and second end caps, the rotatable cam release mechanisms are configured to seat against the plurality of segments.

2. The detachable carrier assembly of claim 1, wherein the first end cap and the second end cap each include opposing tabs configured to clamp the plurality of segments at a desired angle.

3. The detachable carrier assembly of claim 2, wherein one of the opposing tabs includes a clearance aperture and the other of the opposing tabs has a threaded aperture.

4. The detachable carrier assembly of claim 2, wherein the rotatable cam release mechanisms are configured to seat within recesses formed in the first end cap and the second end cap.

5. The detachable carrier assembly of claim 2, wherein the main body of the bracket assembly includes a cavity configured to receive an insert, the insert configured for contact with the head tube of the bicycle.

6. The detachable carrier assembly of claim 1, wherein each of the cam portions includes a leg extending from a main body, the leg configured to provide leverage to the cam portion.

7. A detachable carrier assembly comprising:
    a bracket assembly configured for attachment to a supporting strut, the bracket assembly including a main body and opposing first and second projections extending in axial directions from the main body, a first end cap having an inner race configured to rotatably seat on the first projection and a second end cap having an inner race configured to rotatably seat on the second projection, the first and second end caps each having a rotatable cam release mechanism; and
    a plurality of segments configured for insertion into the first and second end caps of the bracket assembly, the plurality of segments further configured for detachment from the bracket assembly, the plurality of segments connected to a support structure; and
    a container attached to the plurality of segments, the container configured to hold articles;
    wherein with the plurality of segments inserted into the first and second end caps, the rotatable cam release mechanism are configured to seat against the plurality of segments.

8. The detachable carrier assembly of claim 7, wherein the carrier assembly is attached to a bicycle.

9. The detachable carrier assembly of claim 8, wherein the bracket assembly seats against a top tube of the bicycle.

10. The detachable carrier assembly of claim 7, wherein the first end cap and the second end cap each include opposing tabs configured to clamp the plurality of segments at a desired angle.

11. The detachable carrier assembly of claim 10, wherein one of the opposing tabs includes a clearance aperture and the other of the opposing tabs has a threaded aperture.

12. The detachable carrier assembly of claim 10, wherein the rotatable cam release mechanisms are configured to seat within recesses formed in the first end cap and the second end cap.

13. The detachable carrier assembly of claim 10, wherein the main body of the bracket assembly includes a cavity configured to receive an insert, the insert configured for contact with the supporting strut.

14. The detachable carrier assembly of claim 13, wherein each of the cam portions includes a leg extending from a main body, the leg configured to provide leverage to the cam portion.

\* \* \* \* \*